United States Patent
DeSanti

(10) Patent No.: US 12,206,268 B2
(45) Date of Patent: Jan. 21, 2025

(54) JUMPER CABLE APPARATUS

(71) Applicant: Michael J DeSanti, Hawley, PA (US)

(72) Inventor: Michael J DeSanti, Hawley, PA (US)

( * ) Notice: Subject to any disclaimer, the term of this patent is extended or adjusted under 35 U.S.C. 154(b) by 700 days.

(21) Appl. No.: 17/388,305

(22) Filed: Jul. 29, 2021

(65) Prior Publication Data

US 2023/0036828 A1 Feb. 2, 2023

(51) Int. Cl.
*H01R 11/24* (2006.01)
*B60L 53/14* (2019.01)
*H02J 1/10* (2006.01)
*H02J 7/00* (2006.01)

(52) U.S. Cl.
CPC .......... *H02J 7/0036* (2013.01); *B60L 53/14* (2019.02); *H01R 11/24* (2013.01); *H02J 1/122* (2020.01)

(58) Field of Classification Search
CPC ......... H02J 7/0036; H02J 1/122; B60L 53/14; H01R 11/24; H01R 11/32; H01R 2201/26; H01R 31/06
See application file for complete search history.

(56) References Cited

U.S. PATENT DOCUMENTS

| | | | |
|---|---|---|---|
| 9,610,814 B1 * | 4/2017 | Smith | B60D 1/62 |
| 10,033,143 B1 * | 7/2018 | Giordano | H01R 31/06 |
| 2011/0230081 A1 * | 9/2011 | Rinehardt | H01R 13/641 |
| | | | 439/490 |
| 2015/0130401 A1 * | 5/2015 | Pierson | H02J 1/122 |
| | | | 320/105 |
| 2015/0349553 A1 * | 12/2015 | Chapple | H01R 11/24 |
| | | | 320/105 |
| 2016/0023562 A1 * | 1/2016 | Parra Ortiz | B60L 53/14 |
| | | | 320/109 |
| 2017/0346140 A1 * | 11/2017 | Koebler | H01M 4/5825 |
| 2018/0248281 A1 * | 8/2018 | Porter | H01B 9/006 |
| 2018/0345803 A1 * | 12/2018 | Nook | H02J 7/0047 |
| 2020/0295575 A1 * | 9/2020 | Nook | H02J 9/00 |

* cited by examiner

*Primary Examiner* — Abdullah A Riyami
*Assistant Examiner* — Nelson R. Burgos-Guntin
(74) *Attorney, Agent, or Firm* — Mestechkin Law Group P.C.

(57) ABSTRACT

A jumper cable is provided that includes: a first charging transfer cable having first and second opposing ends; a second charging transfer cable having third and fourth opposing ends, and a connecting element at each of the first, second, third, and fourth opposing ends, the connecting element configured to releasably attach respective ends of the first and second charging cables to one or more battery terminals. A portion of the first charging transfer cable is coupled to the second charging transfer cables between a first point of union and a second point of union, and the unequal length portions of the first and second charging transfer cables extend from at least one of the first and second points of union.

11 Claims, 2 Drawing Sheets

JUMPER CABLE APPARATUS

RELATED APPLICATION

This application claims priority to U.S. Provisional Application No. 63/058,244 filed Jul. 29, 2020, entitled "JUMPER CABLE APPARATUS", which is hereby incorporated herein by reference.

BACKGROUND

The present application relates to cables and more particularly to jumper cables for automotive and similar uses.

Jumper cables consist of a set of cables with a corresponding number of clamps at either end for connecting a pair of batteries in parallel, e.g., so that one vehicle may charge the battery of another. The jumper cables known in the art, however, have exposed ends that are prone to accidental contact. This creates a high risk of damage to the vehicles/battery and injury to the user. Accordingly, there is a need for jumper cables that eliminate or substantially reduces the likelihood of accidental physical contact between the clamping elements during the intended use.

SUMMARY OF THE INVENTION

The present application generally provides a jumper cable apparatus configured in such a way to eliminate or substantially ameliorate the chance of accidental physical contact between connecting/clamping elements thereof during the intended use of the jumper cable.

In one embodiment, this is achieved with a jumper cable apparatus that includes a first charging transfer cable having a first end and a second end. The jumper cable apparatus also includes a second charging transfer cable having a third end and a fourth end. The first end terminates with a first connecting element. The second end terminates with a second connecting element. The third end terminates with a third connecting element. The fourth end terminates with a fourth connecting element. Each of the first, second, third, and fourth connecting elements is configured to releasably attach/clamp to the first and second charging transfer cables to battery terminals.

The jumper cable apparatus may have the first, second, third and fourth connecting element color-coded to further assist and facilitate which attaching means is to be attached to a positive terminal of the first and second pair of battery terminals.

The first charging cable and the second charging cable are preferably connecting to each other such that the first connecting element is proximally located to the third connecting element and that the second connecting element is proximally located to the fourth connecting element. In this regard, the jumper cable apparatus provided prevents or lessens the chance of accidental contact between the first connecting element and the third connecting element and prevents or lessens the chance of accidental contact between the second connecting element and the fourth.

In one aspect, a jumper cable is provided that includes: a first charging transfer cable having first and second opposing ends; a second charging transfer cable having third and fourth opposing ends, wherein a portion of the first charging transfer cable is coupled to the second charging transfer cables between a first point of union and a second point of union, and wherein unequal length portions of the first and second charging transfer cables extend from at least one of the first and second points of union; and a connecting element at each of the first, second, third, and fourth opposing ends, the connecting element configured to releasably attach respective ends of the first and second charging cables to one or more battery terminals.

In at least one embodiment, unequal length portions of the first and second charging transfer cables extend from the first and second points of union.

In at least one embodiment, a portion of the first charging transfer cable extending from the at least one of the first and second points of union has a first length that is greater than a portion of the second charging transfer cable extending from the at least one of the first and second points of union.

In at least one embodiment, the portion of the second charging cable extending from the at least one of the first and second points of union has little or no slack relative to the portion of the first charging transfer cable extending from the at least one of the first and second points of union.

In at least one embodiment, connecting elements have proximal and distal ends and wherein the proximal ends are connected to the respective opposing ends of the first and second charging transfer cables.

In at least one embodiment, lengths of the unequal portions are such that, when the jumper cable is extended, the distal end of the connecting element associated with the second charging cable is spaced apart from the proximal end of the connecting element associated with the first charging cable.

In at least one embodiment, the first charging transfer cable has a length that is equal to a length of the second charging transfer cable and wherein the first and second charging transfer cables are coupled such that a midpoint of each of the cables is offset from one another.

In at least one embodiment, the first charging transfer cable and the second charging cable have unequal lengths.

In at least one embodiment, the first and second charging transfer cables are coupled such that a midpoint of each of the cables are aligned.

In at least one embodiment, unequal length portions of the first and second charging transfer cables extend from the first and second points of union, and wherein a portion of the first charging transfer cable extending from each of the first and second points of union has a length that is greater than a length of a portion of the second charging transfer cable extending from each of the first and second points of union.

In at least one embodiment, the portion of the second charging cable extending from each of the first and second points of union has little or no slack relative to the portion of the first charging transfer cable extending from each of the first and second points of union.

In at least one embodiment, connecting elements have proximal and distal ends and wherein the proximal ends are connected to the respective opposing ends of the first and second charging transfer cables.

In at least one embodiment, lengths of the unequal portions are such that, when the jumper cable is extended, the distal end of the connecting element associated with the second charging cable is spaced apart from the proximal end of the connecting element associated with the first charging cable.

In at least one embodiment, the first charging transfer cable and the second charging cable have unequal lengths.

In at least one embodiment, the first and second charging transfer cables are coupled such that a midpoint of each of the cables are aligned.

DETAILED DESCRIPTION OF THE INVENTION

Figure 1:
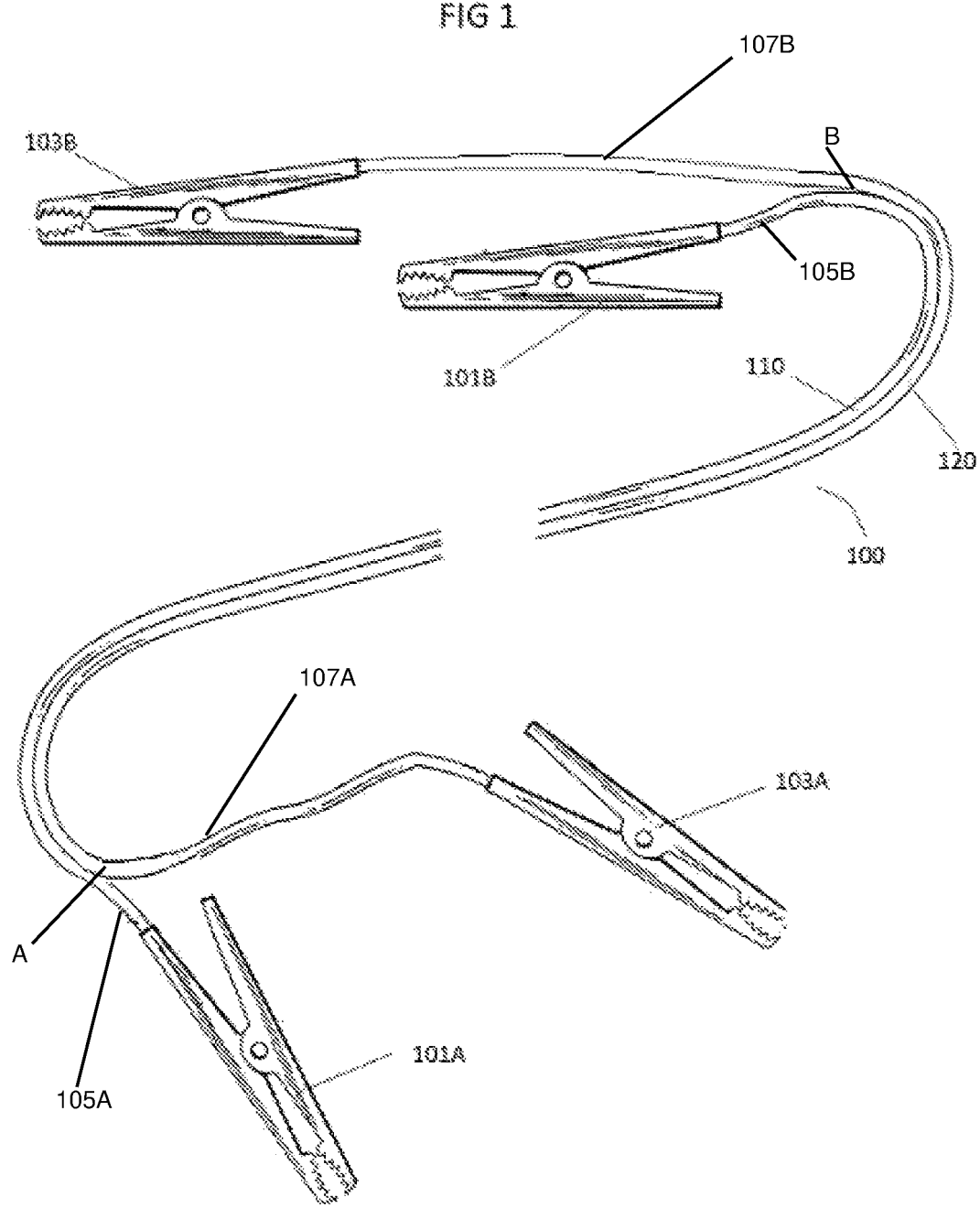
FIG. 1 is a partial longitudinal view showing the jumper cable apparatus.

FIG. 1 illustrates the jumper cable apparatus 100 according to a preferred embodiment. The apparatus 100 includes a first charging transfer cable 110 having a first end and a second end and comprising a second charging transfer cable 120 having a third end and a fourth end. The first end is opposite the second end and the third end is opposite the fourth end.

Each of the ends terminates with a connecting element. Specifically, the first end terminates with a first connecting element 101A. The second end terminates with a second connecting element 101B. The third end terminates with a third connecting element 103A. The fourth end terminates with a fourth connecting element 103B. The set of the first connecting element 101A, first charging cable 110, and second connecting element 101B provide continuity for a first circuit, whereas the set of the third connecting element 103A, second charging cable 120, and fourth connecting element 103B provide continuity for a second circuit.

Each of the connecting elements 101A, 101B, 103A, and 103B is configured to releasably attach/clamp the first and second charging transfer cables to battery terminals (not shown).

Figure 2:
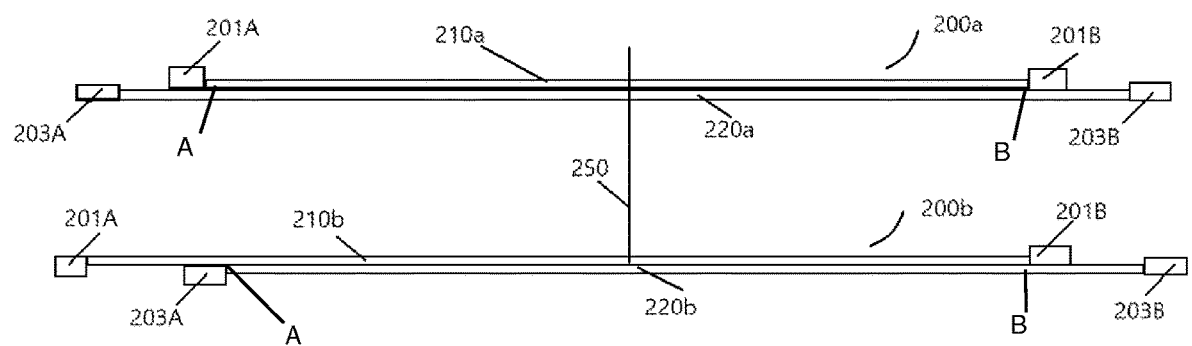
FIG. 2 is a schematic longitudinal view of configuration of charging transfer cables.

A portion of each of the charging transfer cable 110 and charging transfer cable 120 are connected to each other. The connecting element 101A is generally proximally located to the connecting element 103A and that the connecting element 101B is proximally located to the connecting element 103B. In one embodiment, the cables 110, 120 have insulation along their lengths that connects a portion of the cables 110, 120 to each other between points of union A and B. Preferably, a portion of each of the cables 110, 120 extends beyond these points of union A and B. More specifically, unequal length portions 105B, 107B extend from one end of the apparatus 100 from union B and unequal length portions 105A, 107B extend from the opposite end of the apparatus 100 from union A. Generally, the unequal length cable portions locate respective connecting elements 101A, 103A and 101B, 103B a sufficient distance apart from each other to eliminate or significantly reduce the chance of accidental contact. Preferably, one of the pairs of unequal length portions is short relative to the other portion, as shown in FIG. 1. For instance, portions 105A and 105B may have relatively little slack, e.g., be about 1-2 inches, whereas portions 107A and 107B may have more slack, e.g., 12-18 inches. In another embodiment, one of the portions may have an insignificant amount of slack, e.g., no slack, such that the connecting element is located at the point of union A or B, as shown in FIG. 2. Preferably, the lengths of the unequal portions are such that, when extended, the distal end of the connecting element 101B of the shorter portion 105B is spaced apart from the proximal end of the connecting element 103B of the longer portion 107B.

The jumper cable apparatus disclosed herein may have the first, second, third and fourth connecting element color-coded to further assist and facilitate which attaching means is to be attached to a positive terminal of the first and second pair of battery terminals.

An objective of the apparatus disclosed herein is to prevent or significantly minimize accidental contact between the connecting element 101A and the connecting element 103A, as well as, to prevent or significantly minimize accidental contact between the connecting element 101B and the connecting element 103B during the intended use of the jumper cable apparatus.

The jumper cable apparatus 100 disclosed herein achieves the main objective by having respective ends of the charging transfer cable 110 and the charging transfer cable 120 terminate at a different length, respective of each other, from the midpoint of the jumping cable apparatus 100.

FIG. 2 illustrates the various configurations that the charging transfer cables of the jumping cable apparatus may be positioned respective of each other to prevent or significantly minimize accidental contact between the connecting element 101A and the connecting element 103A, as well as, to prevent or significantly minimize accidental contact between the connecting element 101A and the connecting element 103B during the intended use of the jumper cable apparatus.

The jumper cable apparatus presented in an embodiment 200a, shows charging transfer cable 210a having a length that is less than the length of the charging transfer cable 220a. In this embodiment, midpoint of charging cable 210A is aligned with midpoint of charging cable 220a at the point 250, but, due to the difference in the length of the charging transfer cables, connecting elements 201A and 203A are separated by a sufficient length, thereby precluding or significantly minimizing the likelihood of any physical contact between connecting elements 201A and 203A. Same is true for connecting elements 201B and 203B.

The jumper cable apparatus presented in an embodiment 200b, shows charging transfer cable 210b having the length that is identical to the length of the charging transfer cable 220b. In this embodiment, positioning of charging transfer cable 210b is laterally shifted respective the charging transfer cable 220b such that the midpoint of charging transfer cable 210b is not aligned with midpoint of charging transfer cable 220b, thereby ensuring that connecting elements 201A and 203A are separated by a sufficient distance, thereby precluding or significantly minimizing the likelihood of any physical contact between connecting elements 201A and 203A. Same is true for connecting elements 201B and 203B.

It is to be understood that a person ordinarily skilled in the art that described configuration is provided as an illustrative embodiment and that the invention disclosed herein may be configured differently. For example, the difference in the length of the charging transfer cable may be applicable for only one end of the jumper cable apparatus respective to the midpoint of the jumper cable apparatus.

The foregoing descriptions and drawings of the invention are explanatory and illustrative only, and various changes in shapes, sizes and arrangement of parts as well as certain details of the illustrated construction may be made within the scope of the appended claims without departing from the true spirit of the invention.

What is claimed is:

1. A jumper cable comprising:
    a first charging transfer cable having first and second opposing ends;
    a second charging transfer cable having third and fourth opposing ends,
    wherein a portion of the first charging transfer cable is coupled to the second charging transfer cables between a first point of union and a second point of union, and
    wherein unequal length portions of the first and second charging transfer cables extend from at least one of the first and second points of union; and
    a connecting element at each of the first, second, third, and fourth opposing ends, the connecting element configured to releasably attach respective ends of the first and second charging cables to one or more battery terminals, wherein the unequal length portions of the first and second charging transfer cables extend from the first and second points of union, and wherein a portion of the first charging transfer cable extending from each of the first and second points of union has a length that is greater than a length of a portion of the second charging transfer cable extending from each of the first and second points of union, wherein the portion of the second charging cable extending from each of the first and second points of union has little or no slack relative to the portion of the first charging transfer cable extending from each of the first and second points of union, wherein the connecting elements have proximal and distal ends and wherein the proximal ends are connected to the respective opposing ends of the first and second charging transfer cables, and wherein lengths of the unequal portions extending outward from the first and second points of union are such that, when the jumper cable is fully extended, the distal end of the each of the connecting elements associated with the second charging cable is spaced apart lengthwise from the proximal end of the respective connecting elements associated with the first charging cable.

2. The jumper cable of claim 1, wherein unequal length portions of the first and second charging transfer cables extend from the first and second points of union.

3. The jumper cable of claim 1, wherein a portion of the first charging transfer cable extending from the at least one of the first and second points of union has a first length that is greater than a portion of the second charging transfer cable extending from the at least one of the first and second points of union.

4. The jumper cable of claim 3, wherein the portion of the second charging cable extending from the at least one of the first and second points of union has little or no slack relative to the portion of the first charging transfer cable extending from the at least one of the first and second points of union.

5. The jumper cable of claim 3, wherein connecting elements have proximal and distal ends and wherein the proximal ends are connected to the respective opposing ends of the first and second charging transfer cables.

6. The jumper cable of claim 5, wherein lengths of the unequal portions are such that, when the jumper cable is extended, the distal end of the connecting element associated with the second charging cable is spaced apart from the proximal end of the connecting element associated with the first charging cable.

7. The jumper cable of claim 1, wherein the first charging transfer cable has a length that is equal to a length of the second charging transfer cable and wherein the first and second charging transfer cables are coupled such that a midpoint of each of the cables is offset from one another.

8. The jumper cable of claim 1, wherein the first charging transfer cable and the second charging cable have unequal lengths.

9. The jumper cable of claim 8, wherein the first and second charging transfer cables are coupled such that a midpoint of each of the cables are aligned.

10. The jumper cable of claim 1, wherein the first charging transfer cable and the second charging cable have unequal lengths.

11. The jumper cable of claim 10, wherein the first and second charging transfer cables are coupled such that a midpoint of each of the cables are aligned.

\* \* \* \* \*